US005325710A

United States Patent [19]

Morikawa

[11] Patent Number: 5,325,710

[45] Date of Patent: Jul. 5, 1994

[54] CRANK ANGLE DETECTING SYSTEM FOR A TWO-CYCLE ENGINE

[75] Inventor: Koji Morikawa, Tokyo, Japan

[73] Assignee: Fuji Jikogyo Kabushiki Kaisha, Tokyo, Japan

[21] Appl. No.: 892,166

[22] Filed: Jun. 2, 1992

[30] Foreign Application Priority Data

Jun. 26, 1991 [JP] Japan ............................. 3-57166[U]

[51] Int. Cl.$^5$ ............................................ G01M 15/00

[52] U.S. Cl. ........................................ 73/116; 123/414

[58] Field of Search .................. 73/116; 123/414, 476, 123/612; 341/6

[56] References Cited

U.S. PATENT DOCUMENTS

| | | | |
|---|---|---|---|
| 4,553,427 | 11/1985 | Kuraoka et al. | 73/117.3 |
| 4,856,489 | 8/1989 | Ozawa et al. | 123/643 |
| 5,010,864 | 4/1991 | Matsuoka et al. | 123/414 |
| 5,070,726 | 12/1991 | Fukui et al. | 73/116 |

FOREIGN PATENT DOCUMENTS

| | | |
|---|---|---|
| 59-109914 | 7/1984 | Japan . |
| 59-174335 | 11/1984 | Japan . |

*Primary Examiner*—Jerry W. Myracle
*Attorney, Agent, or Firm*—Martin A. Farber

[57] ABSTRACT

A crank angle detecting system for a two-cycle engine has a first detecting disk secured to a crankshaft and having a plurality of first projections, a second detecting disk secured to the crankshaft and having three projections, a first pickup for detecting the first projections and a second pickup for sensing the second projections. The second projections are disposed such that pulses produced by the second projections for a cylinder of the engine are generated at a timing different from the other cylinders of the engine.

2 Claims, 3 Drawing Sheets

CRANK ANGLE DETECTING SYSTEM FOR A TWO-CYCLE ENGINE

BACKGROUND OF THE INVENTION

The present invention relates to a system for detecting crank angle of a two-cycle engine.

In order to economize fuel consumption and to improve performance of the two-cycle engine as well as an emission control, a fuel injection timing and an ignition timing of the engine are controlled by an electronic control system. In the electronic control system, the crank angle is detected for controlling the fuel injection timing and the ignition timing.

Japanese Utility Model Application Laid-open 59-109914 discloses a crank angle detecting system in which a rotating disk having a plurality of slits and reflecting plates is secured to a crankshaft of the engine. The slits and reflecting plates are provided on the rotating disk at predetermined distances for detecting the crank angle and for discriminating a cylinder number, respectively. The crank angle is detected by lights which are emitted from a light emitting device passing through the slits. The lights reflected on the reflecting plates are detected by a photo detector for discriminating the cylinder number.

Japanese Utility Model Application Laid-open 59-174335 discloses a rotating angle sensor in which a plurality of projections made of magnetic material are provided on a rotor plate in place of the reflecting plates. The projections are detected by a magnetic detecting device for discriminating the cylinder number.

In the two-cycle engine, it is desirable to provide a crank angle detecting system having functions as follows:

(1) producing pulses as a basic signal for controlling the fuel injection and ignition, (2) discriminating the cylinder number, (3) determining the rotating direction of the crankshaft, for preventing rotation in the reverse direction, (4) determining fixed timings for fuel injection and ignition at starting of the engine.

If the crank angle detecting system has the above four functions, it is possible to simplify the electronic control, thereby improving control accuracy.

However, in the conventional devices, since the function relative to the rotating direction and the fixed timings for the fuel injection and ignition at starting are not provided in the crank angle detecting system, it is impossible to simplify the control and to improve the control accuracy.

SUMMARY OF THE INVENTION

An object of the present invention is to provide a crank angle detecting system for a two-cycle engine in which the electronic control is simplified, thereby improving the control accuracy.

According to the present invention, there is provided a crank angle detecting system for the two-cycle engine having a crankshaft, a first detecting disk coaxially connected to an end of the crankshaft and provided with a plurality of first projections, a second detecting disk coaxially connected to the end of the crankshaft and the first detecting disk and provided with second projections, a first pickup for detecting the first projections and for producing a first pulse signal having regular intervals, and a second pickup for sensing the second projections and for generating a second pulse signal, the second projections being disposed such that pulses produced by the second projections for a cylinder of the engine is generated at a timing different from the other cylinders of the engine.

The system comprises a first waveform shaping circuit responsive to the first pulse signal for forming into pulses and for generating a regular pulse signal, a second waveform shaping circuit responsive to the second pulse signal for forming into pluses and for generating an irregular pulse signal, discriminating means responsive to the regular and irregular pulse signals for discriminating a cylinder number and for generating a cylinder number signal, determining means responsive to the irregular pulse signals for determining a rotational direction, and timing control means responsive to the regular pulse signal, the cylinder number signal and direction signal for calculating an ignition timing so as to obtain an accurate control of the system.

In an aspect of the invention, the second projections comprise three projections which are disposed at different intervals from each other.

The other objects and features of this invention will become understood from the following description with reference to the accompanying drawings.

DETAILED DESCRIPTION OF THE PREFERRED EMBODIMENT

Figure 4:
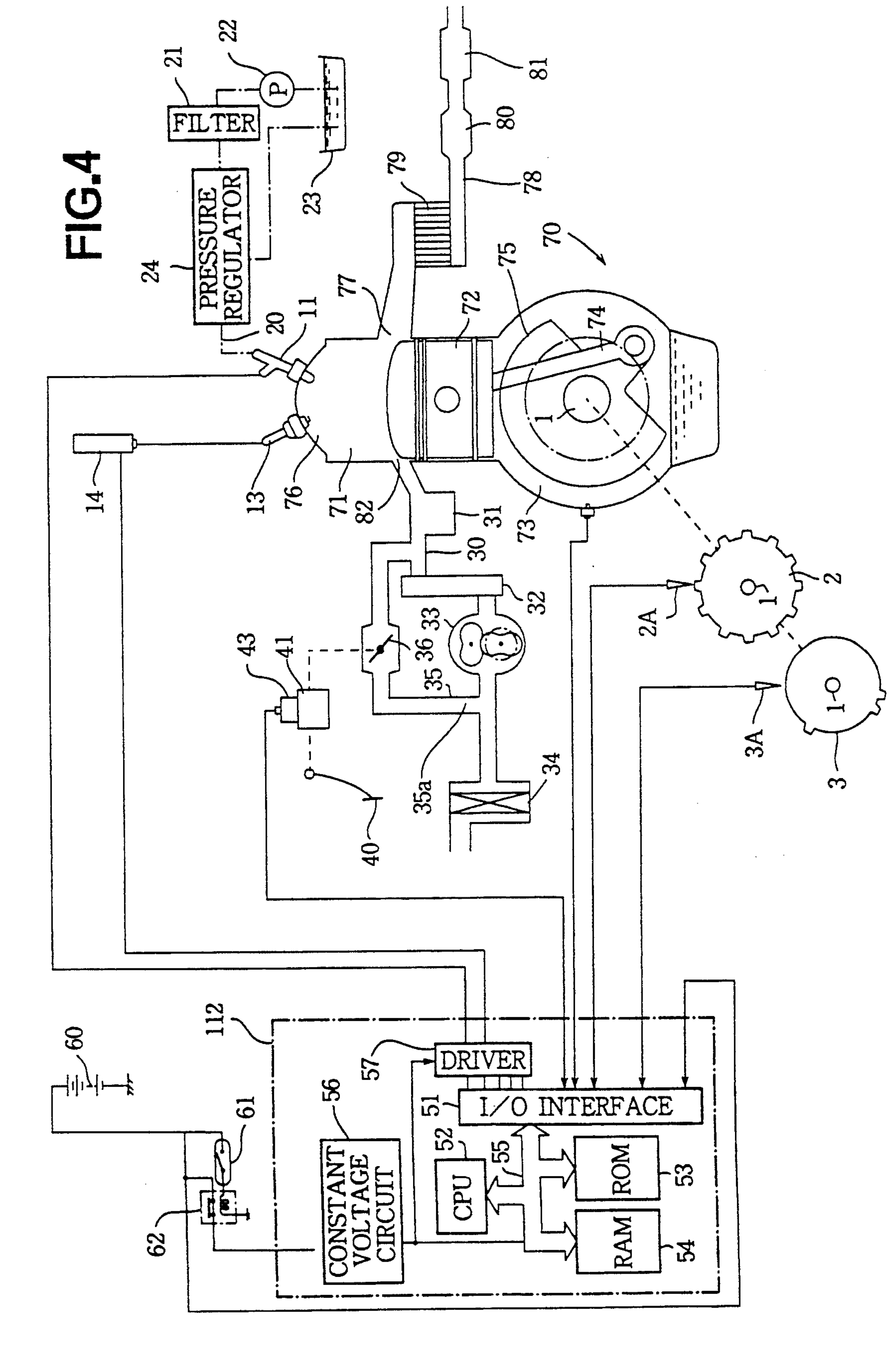
FIG. 4 is a schematic diagram showing a two-cycle engine applied to the system according to the present invention.

Referring to FIG. 4, a two-cycle engine 70 which is adapted with a crank angle detecting system according to the present invention for a motor vehicle comprises a cylinder 71, a piston 72 provided in the cylinder 71, a connecting rod 74 connected with the piston 72 and a crankshaft 1 disposed in a crankcase 73. A counterweight 75 is mounted on the crankshaft 1 so as to reduce inertia of the piston 72 reciprocating in the cylinder 7.

In a wall of the cylinder 71, an exhaust port 77 and a scavenge port 82 are formed in 90 degrees angular disposition or opposing one another. The ports 77 and 82 are adapted to open at a predetermined timing with respect to a position of the piston 72.

A fuel injector 11 and a spark plug 13 are provided at a top of a combustion chamber 76 of the cylinder 72. The injector 11 is a type where a predetermined amount of fuel is injected. Fuel in a fuel tank 23 is supplied to the injector 11 through a fuel passage 20 having a filter 21, a pump 22 and a pressure regulator 24 for constantly maintaining the fuel at a predetermined high fuel pressure.

The engine 70 is supplied with air through an air cleaner 34, a displacement scavenge pump 33, an intercooler 32 for cooling scavenge air, and an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve 36 for controlling the load on the engine 70. Exhaust gas of the engine 70 is discharged through the exhaust port 77, an exhaust pipe 78 having a catalytic converter 79, an exhaust chamber 80 and a muffler 81.

The scavenge pump 33 is operatively connected to the crankshaft 5 through a transmitting device (not shown). The scavenge pump 33 is driven by the crankshaft 5 through the transmitting device for producing the scavenge pressure. An accelerator pedal 40 is operatively connected with the control valve 36 through a valve controller 41. An opening degree of the control valve 36 is controlled by the controller 41 so as to be inversely proportional to a depressing degree of the accelerator pedal 40.

An electronic control unit 112 having a microcomputer comprises a CPU (central processing unit) 52, a ROM 53, a RAM 54 and an input/output interface 51, which are connected to each other through a bus line 55. A constant voltage circuit 56 is connected to each element of the control unit 112 for supplying a predetermined constant voltage. Power is applied from a battery 60 to the constant voltage circuit 62 through a contact of a relay 62. The battery 60 is connected to a coil of the relay 62 through an ignition switch 61, and to the fuel pump 22.

Output signals of the sensors and the switch are applied to an input port of the input/output interface 51. An output port of the I/O interface 51 is connected to the spark plug 13 of the cylinder through an igniter 14 and a driver 57 which is connected to injectors 10.

Control programs and fixed data are stored in the ROM 53. Output signals of the sensors are stored in the RAM 54. The RAM 54 stores output signals of the sensors after processing data in the CPU 52.

The CPU 52 calculates a fuel injection pulse width and timing and an ignition timing in accordance with the control programs in the ROM 53 and based on various data in the RAM 54. The corresponding signals are fed to the injector 20 and spark plug for controlling the air-fuel ratio, injection timing and ignition timing, respectively.

Figure 1:
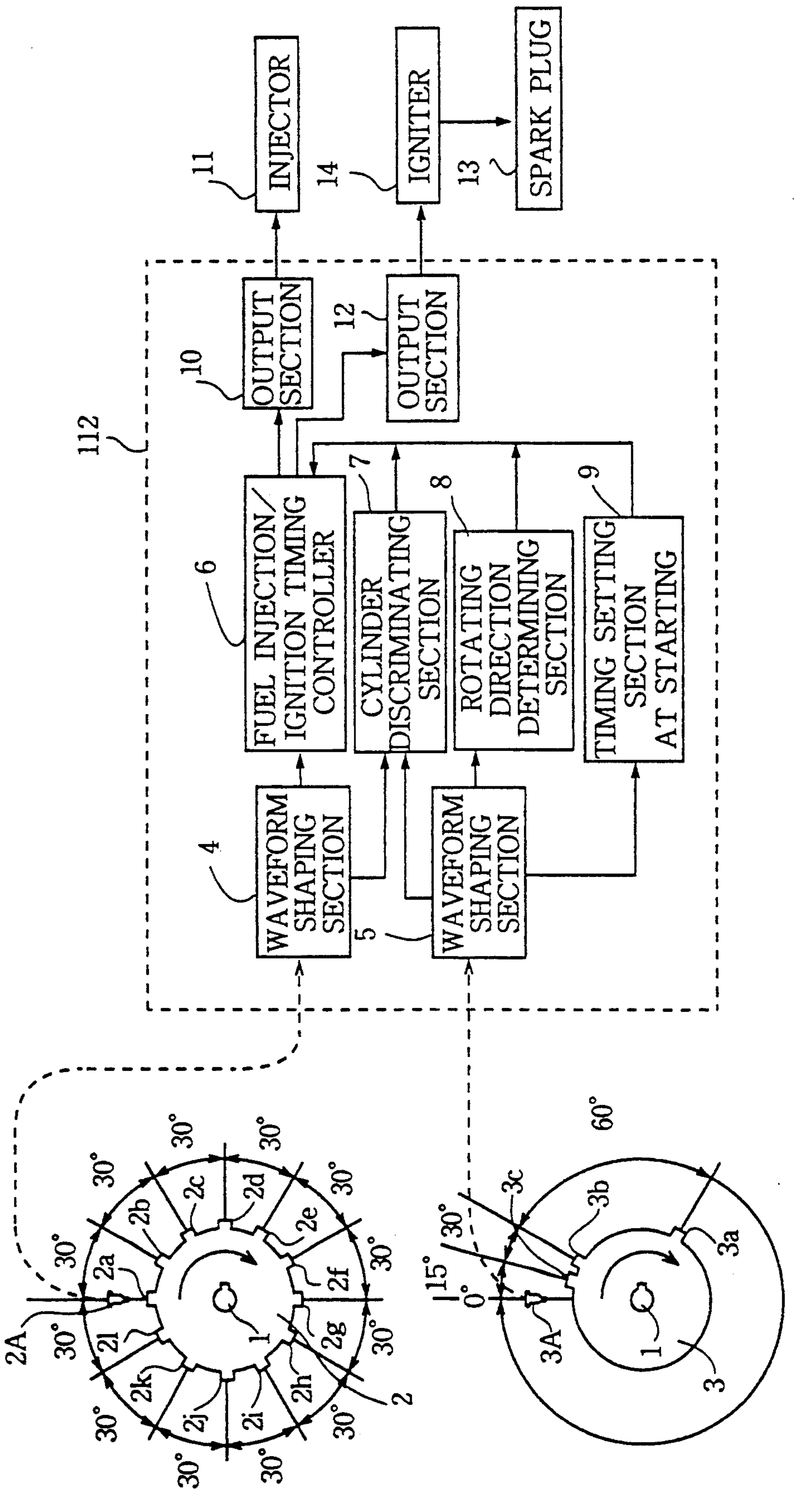
FIG. 1 is a functional diagram showing a system according to the present invention.

Referring to FIG. 1, a crank angle detecting system of the present invention comprises a first detecting disk 2 and a second detecting disk 3 mounted on a crankshaft 1 of a two-cycle engine, and an electronic control unit 12. Both disks 2 and 3 are made of magnetic material. The first detecting disk 2 has twelve projections 2*a* to 21 formed on the outer periphery thereof and disposed at equal angular intervals of 30 degrees. The second detecting disk 3 is provided with three projections 3*a*, 3*b* and 3*c* formed on the outer periphery thereof. For the first cylinder, the projection 3*a* is disposed at a crank angle 105° before top dead center (BTDC), the projection 3*b* is disposed at 45° BTDC, and the projection 3*c* is disposed at 15° BTDC.

Figure 2:
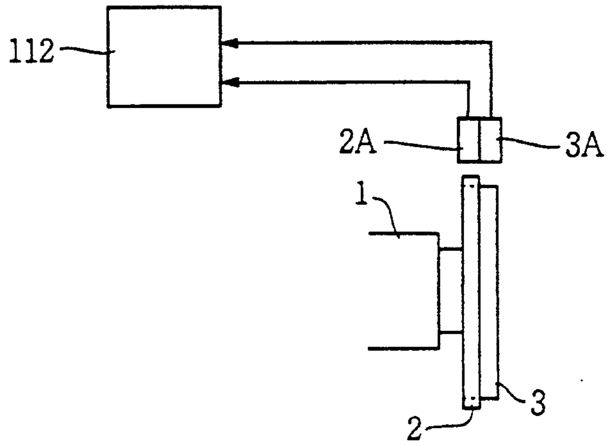
FIG. 2 is a schematic side view showing crankshaft disks and sensors.

As shown in FIG. 2, the detecting disks 2 and 3 are secured to an end of the crankshaft 1. A magnetic pickup 2A is provided adjacent the first detecting disk 2 and a magnetic pickup 3A is provided adjacent the second detecting disk 3. When the detecting disks 2 and 3 rotate, the magnetic pickups 2A and 3A detect the positions of the respective projections 2*a* to 21 and 3*a* to 3*c* and produce signals, respectively.

The control unit 112 comprises a waveform shaping section 4 applied with the signal from the magnetic pickup 2A, and a waveform shaping section 5 applied with the signal from the magnetic pickup 3A. In the sections 4 and 5, the input signals are shaped in the form of pulses. The pulse signal from the waveform shaping section 4 is applied to a fuel injection/ignition timing control section 6 for controlling the fuel injection timing and the ignition timing. A cylinder discriminating section 7 is applied with the pulse signals from the waveform shaping sections 4 and 5 for discriminating the cylinder to be ignited. The pulse signal from the waveform shaping section 5 is further applied to a rotating direction determining section 8 for determining the rotating direction of the crankshaft and to a timing setting section at starting 9 for setting fixed timings of fuel injection and ignition at starting of the engine. A control signal from the fuel injection/ignition timing section 6 is applied to the injector through an output section 10 for actuating fuel injectors and is applied to the spark plug through an output section 12 and igniter 14 to actuate the spark plugs.

Figure 3:
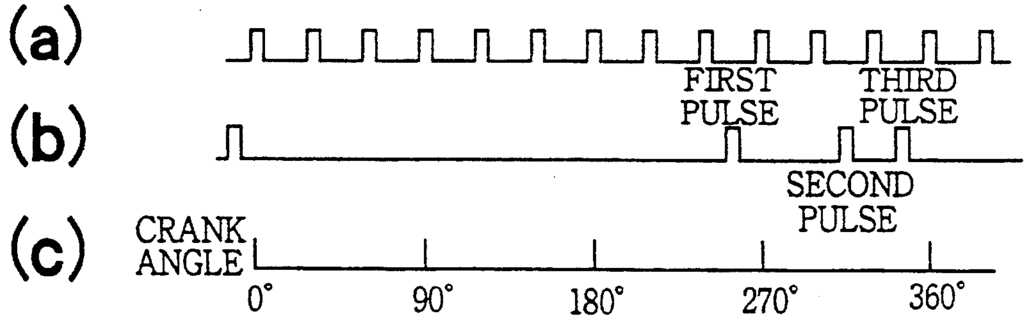
FIG. 3 is a time chart showing waveforms of pulse signals, and a crank angle.

The operation of the system will be described hereinafter. When the engine is started, the crankshaft 1 is rotated together with the first and second detecting disks 2 and 3. The magnetic pickup 2A detects the projections 2*a* to 21 of the first disk 2 to produce crank angle signals which are applied to the waveform shaping circuit 4. The circuit 4 produces a pulse signal having twelve pulses, which is shown by a waveform a of FIG. 3. On the other hand, the magnetic pickup 3A detects the projections 3*a* to 3*c* of the second disk 3 to produce crank angle signals which are applied to the waveform shaping circuit 5. The circuit 5 produces a pulse signal which is shown by a waveform b of FIG. 3.

The fuel injection/ignition timing control section 6 operates to provide the above described basic signal (1) by time-sharing the intervals between the pulses of the pulse signal a. In accordance with the pulse signals a and b from the waveform shaping circuits 4 and 5, the cylinder discriminating section 7 detects the timing of the generation of the pulse signal b based on the pulse of the pulse signal a. Namely, while the disk 3 rotates one revolution, the magnetic pickup 3A produces pulse signals at particular timings for each cylinder because of the two-cycle engine. Therefore by counting the number of pulses of the pulse signal a between the respective pulses of the pulse signal b, the top dead center of each cylinder can be discriminated. A discriminated signal is applied to the control section 6.

In the rotating direction determining section 8, the ordinary rotation and the reverse rotation of the crankshaft are determined by counting the pulses between the pulses of signal b and by detecting the generating order of the number of the pulses. Namely, when no pulse is generated during 60° or a first pulse is generated at crank angle 270° after a preceding pulse, and a second pulse is generated at crank angle 60° after a first pulse, the ordinary rotational direction is determined. To the contrary, when no pulse is generated during 60° and the second pulse is generated at angle 30° after the first pulse, the reverse rotation is determined. A determined signal is applied to the control section 6.

The timing setting section 9 is operated to set the fuel injection timing and the ignition timing at starting the engine in accordance with the pulse signal b. Namely, section 9 produces a first fuel injection signal based on a first pulse by the projection 3*a* after cranking for injecting a predetermined amount of fuel for the first time. A second fuel injecting signal is produced based on a second pulse by the projection 3*b* for further injecting a predetermined amount of fuel for the second time. At the third pulse by the projection 3*c*, the section 9 produces an ignition timing signal for igniting the injected fuel. The respective signals are applied to the control section 6.

The control section 6 produces the control signal in accordance with the basic pulse signal and the respective input signals from the sections 7, 8 and 9.

In accordance with the present invention, the system produces signals necessary for controlling the operation of the two-cycle engine, thereby simplifying the control of the engine.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A crank angle detecting system for a two-cycle engine having a crankshaft, a first detecting disk coaxially connected to an end of said crankshaft and provided with a plurality of first projections disposed at equal angular intervals, a second detecting disk coaxially connected to said end of the crankshaft and said first detecting disk and provided with second projections disposed at un-equal angular intervals, the number of the second projections being smaller than the number of the first projections, a first pickup for detecting said first projections and for producing first pulse signals having regular intervals, and a second pickup for detecting said second projection and for generating second pulse signals, said second projections being disposed such that pulses produced by the second projections for one of the cylinders of the engine are generated at a timing different from the other cylinders of the engine, an improvement of the system comprising:

a first waveform shaping circuit responsive to said first pulse signals for generating regular pulse signals occurring at regular intervals;

a second waveform shaping circuit responsive to said second pulse signals for generating irregular pulse signals occurring at irregular intervals;

discriminating means responsive to said regular and said irregular pulse signals for discriminating a cylinder number and for generating a cylinder number signal;

determining means responsive to said irregular pulse signals for determining a rotational direction and for generating a direction signal; and timing control means responsive to said regular pulse signal, to said cylinder number signal and to said direction signal for calculating an ignition timing for accurate control of said system.

2. A system according to claim 1, wherein said second projections comprising three projections which are disposed at different intervals from each other.

* * * * *